United States Patent [19]

Okada et al.

[11] Patent Number: 5,138,354
[45] Date of Patent: Aug. 11, 1992

[54] CAMERA HAVING DETECTORS FOR DETECTING THE PHOTO-TAKING INTENTION OF A PHOTOGRAPHER

[75] Inventors: Hiroyuki Okada; Masayuki Ikemura; Yukari Maeda, all of Osaka; Koh Hayama, Kumamoto; Takeshi Hashimoto; Katsuyuki Nanba, both of Osaka, all of Japan

[73] Assignee: Minolta Camera Kabushiki Kaisha, Osaka, Japan

[21] Appl. No.: 547,506

[22] Filed: Jul. 2, 1990

[30] Foreign Application Priority Data

Jul. 3, 1989 [JP] Japan .................. 1-171669
Jul. 3, 1989 [JP] Japan .................. 1-171670

[51] Int. Cl.⁵ ............... G03B 5/00; G03B 7/26; G03B 13/36; G03B 13/02
[52] U.S. Cl. .................. 354/400; 354/484; 354/195.1; 354/219
[58] Field of Search ........... 354/400, 410, 412, 195.1, 354/195.12, 219, 484, 486, 238.1, 266, 267.1, 268, 456, 288, 402

[56] References Cited

U.S. PATENT DOCUMENTS

| | | | |
|---|---|---|---|
| 3,418,909 | 12/1968 | Rabinow | 354/456 |
| 3,921,187 | 11/1975 | Kobori et al. | 354/486 |
| 4,036,762 | 7/1977 | Troetscher et al. | 354/266 X |
| 4,142,788 | 3/1979 | Matsumoto et al. | 354/53 |
| 4,269,489 | 5/1981 | Takimoto | 354/266 X |
| 4,350,418 | 9/1982 | Taguchi et al. | 354/400 |
| 4,429,974 | 2/1984 | Suzuki | 354/484 |
| 4,466,724 | 8/1984 | Masunaga | 354/402 |
| 4,542,970 | 9/1985 | Suzuki et al. | 354/400 |
| 4,740,807 | 4/1988 | Hoshino et al. | 354/412 |
| 4,942,417 | 7/1990 | Miyazawa et al. | 354/400 |

FOREIGN PATENT DOCUMENTS 62-24232  2/1987  Japan .
63-18172  4/1988  Japan .
64-42639  2/1989  Japan .

Primary Examiner—W. B. Perkey
Attorney, Agent, or Firm—Willian Brinks Olds Hofer Gilson & Lione

[57] ABSTRACT

A camera equipped with detectors for detecting: a) the photographer is holding the camera grip, and b) the photographer is looking into the viewfinder of the camera. When both are detected, which can be assumed that he is taking a photograph in the near future, a predetermined operation of the camera (e.g., an automatic program zooming, an autofocusing, a photometering, etc.) is started. The detectors can also be used for ending a predetermined operation of the camera. When the photographer no longer holds the grip or when he no longer looks into the viewfinder, it is assumed that he is not going to take a photograph and hence it is better not to continue some proper operation for conserving the battery power. For confirming the judgment, it is preferred to check the detection twice in any case.

47 Claims, 6 Drawing Sheets

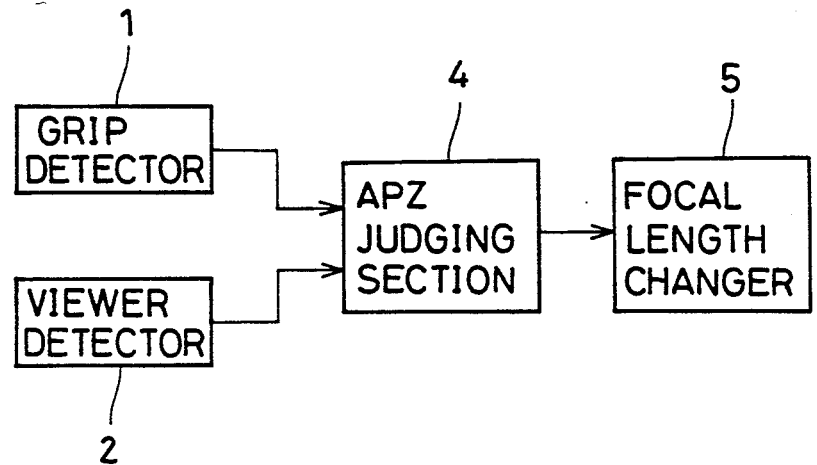
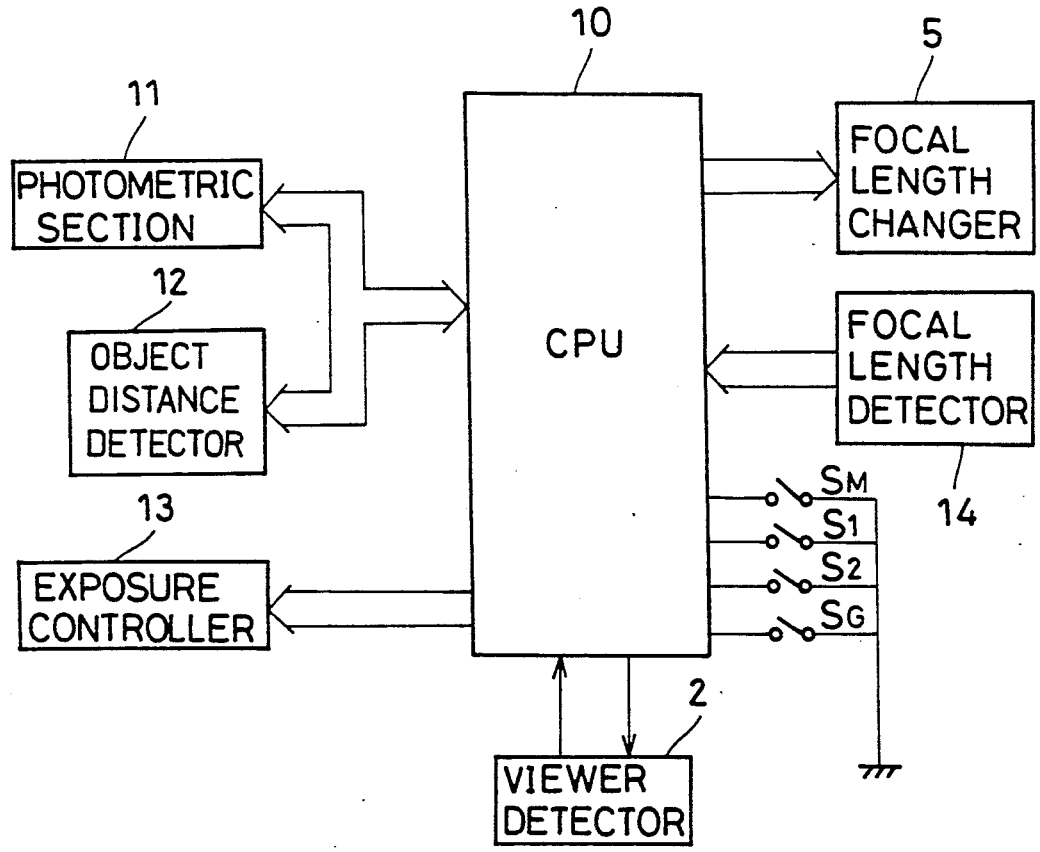

17 OPERATING BUTTON

16 GRIP PORTION

18 GRIP BUTTON

19: VIEWFINDER
20: PHOTO-EMITTER
21: PHOTO-RECEPTOR

CAMERA HAVING DETECTORS FOR DETECTING THE PHOTO-TAKING INTENTION OF A PHOTOGRAPHER

The present invention relates to a camera with an automatic function (such as automatic zooming, autofocusing, automatic exposure control, etc.), and detectors for detecting the photo-taking intention of a photographer.

BACKGROUND OF THE INVENTION

An APZ (Automatic Program Zooming) is already known in which a zoom lens of a camera is automatically driven (i.e., the focal length of the zoom lens is adjusted) to take a picture of a main object (e.g., a man) so that the size of the main object in the picture frame is adjusted. Normally, the APZ is performed by the following process. First, the distance D to the main object is detected, and then a necessary magnification $\beta$ for projecting the main object at the distance D onto a film with a predetermined size is determined using a line of a previously prepared diagram. There may be several lines on a diagram for different purported sizes in a picture frame (e.g., for full portrait and bust portrait). The target focal length of the zoom lens is calculated by:

$$f = \beta \cdot D, \quad (1)$$

and the zoom motor is driven to bring the zoom lens at the focal length f.

Another prior art relating to the present invention is the detection of a photographer looking into a viewfinder. Japanese Published Unexamined Patent Application No. S52-110037 shows a camera having a thermosensor for sensing an access by a photographer. The thermosensor is placed near the viewfinder, and when a photographer looks into the viewfinder, the thermosensor senses his body heat. When the sensor detects the heat, power is supplied to the focus condition detector of the camera. A problem about this human body heat detection is that it does not always work correctly. When some heat radiation comes into the thermosensor near the viewfinder from behind the camera, unnecessary focus detection is performed.

Japanese Published Unexamined Patent Application No. S64-42639 discloses a camera in which: a focus condition detecting operation is started when a photographer is detected to take hold of a grip portion of the camera, and the auto-focusing lens is driven when the photographer is detected to look into the viewfinder. A problem of this camera is that a focus condition detecting operation is started before he looks into the viewfinder. Because the picture frame cannot be decided before the photographer looks into the viewfinder, the detecting operation is useless. Also, the battery power will be wasted while he simply holds the camera without an intention of taking a picture.

SUMMARY OF THE INVENTION

An object of the present invention is therefore to provide a detector for assuredly detecting the time when a photographer is going to take a photograph to automatically start a predetermined automatic function (e.g., automatic zooming, autofocusing, automatic exposure control, etc.) of a camera.

Another object of the present invention is to provide a similar detector for assuredly detecting the time when the photographer is no longer taking a photograph to automatically end the automatic function.

The first object is achieved by one feature of the present invention in which a camera comprises: a portion for holding the camera in taking a photograph; a first detector for detecting that a photographer holds the portion and for generating a first detection signal; a second detector for detecting that the photographer is in the vicinity of the camera and for generating a second detection signal; and a controller for starting a predetermined operation of the camera responsive to both the first detection signal and the second detection signal. Another feature of the invention addresses the same object with further assured detection. By this feature, a camera comprises: a detector for detecting that a photographer is in the vicinity of the camera and for generating a detection signal; a counter for counting the number of the detection signal generated by the detector and for generating a decision signal when the number reaches a preset value; and a controller for starting a predetermined operation of the camera responsive to the decision signal. Similarly for assuring the detection, another camera according to the present invention comprises: a detector for detecting that a photographer is in the vicinity of the camera and for generating a detection signal; a timer for counting a time since the detection signal is generated by the detector and for generating a decision signal when the time reaches a preset value; and a controller for starting a predetermined operation of the camera responsive to the decision signal.

The other object for ending an automatic function and still other relating objects are achieved by various features of the present invention which will be described in the detailed description of an embodiment that follows.

BRIEF DESCRIPTION OF THE ATTACHED DRAWINGS

FIG. 1 is a functional block diagram of a camera as an embodiment of the present invention.

FIG. 2 is a electrical block diagram of the camera.

Figure 4A:
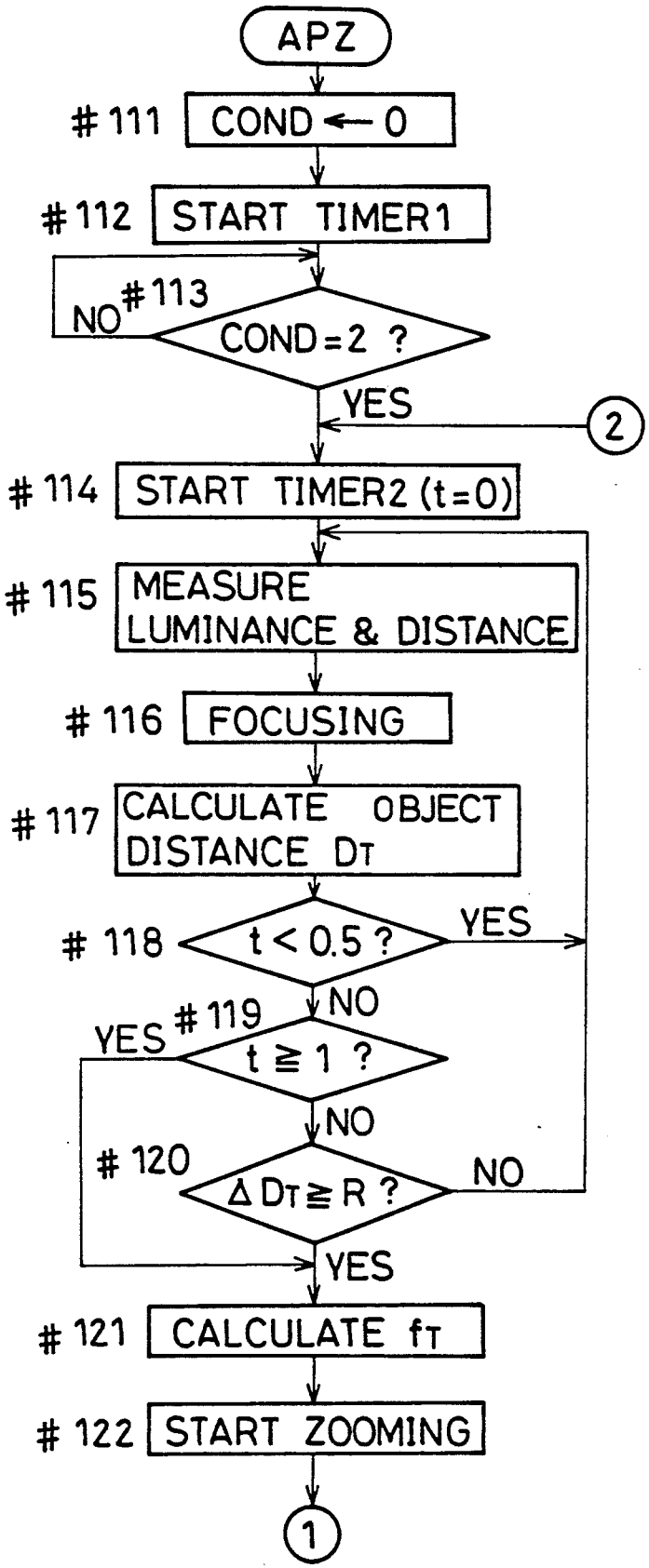
Figure 4B:
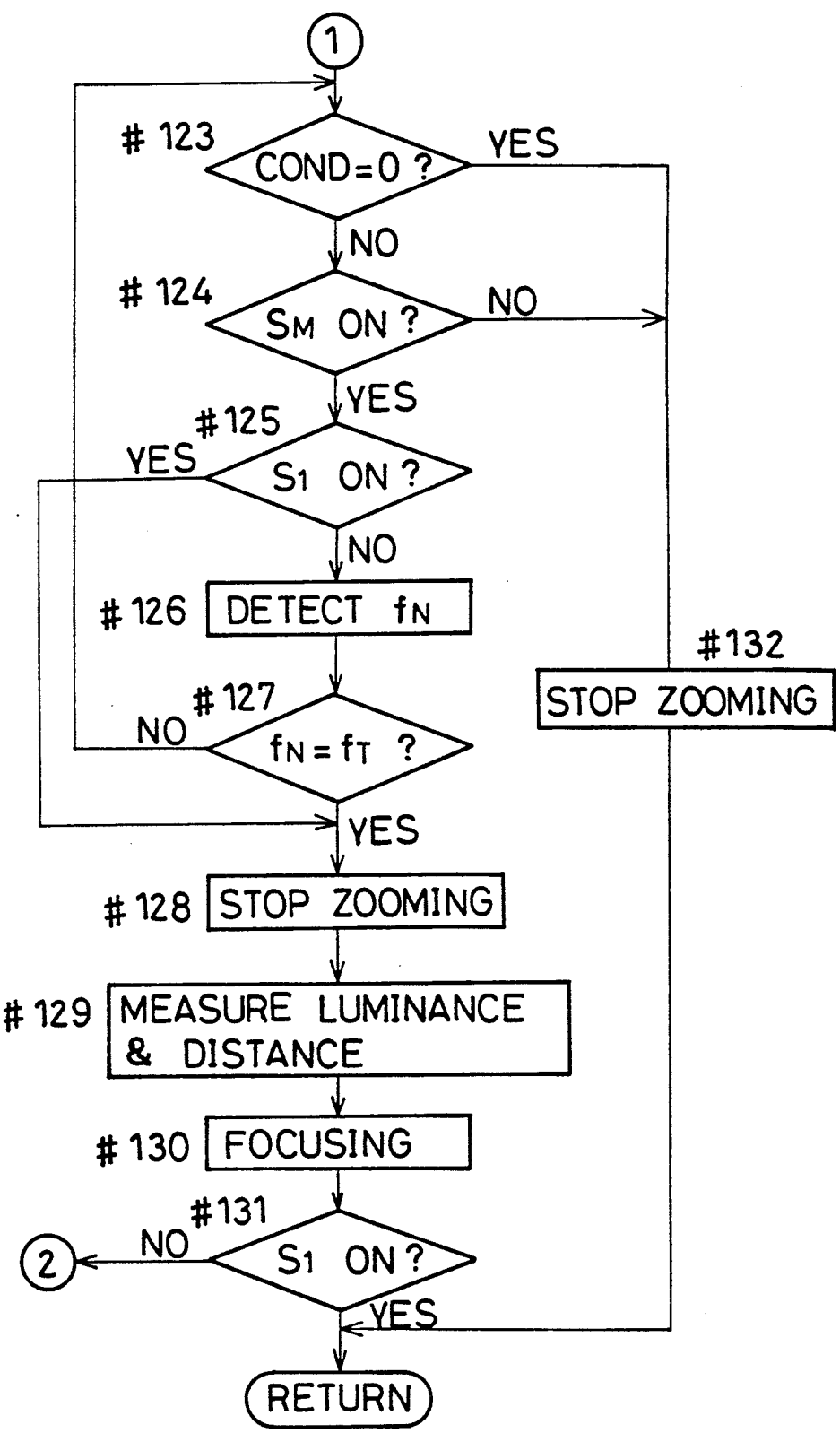

FIGS. 4A and 4B integrally show a flowchart of an APZ routine.

Figure 5:
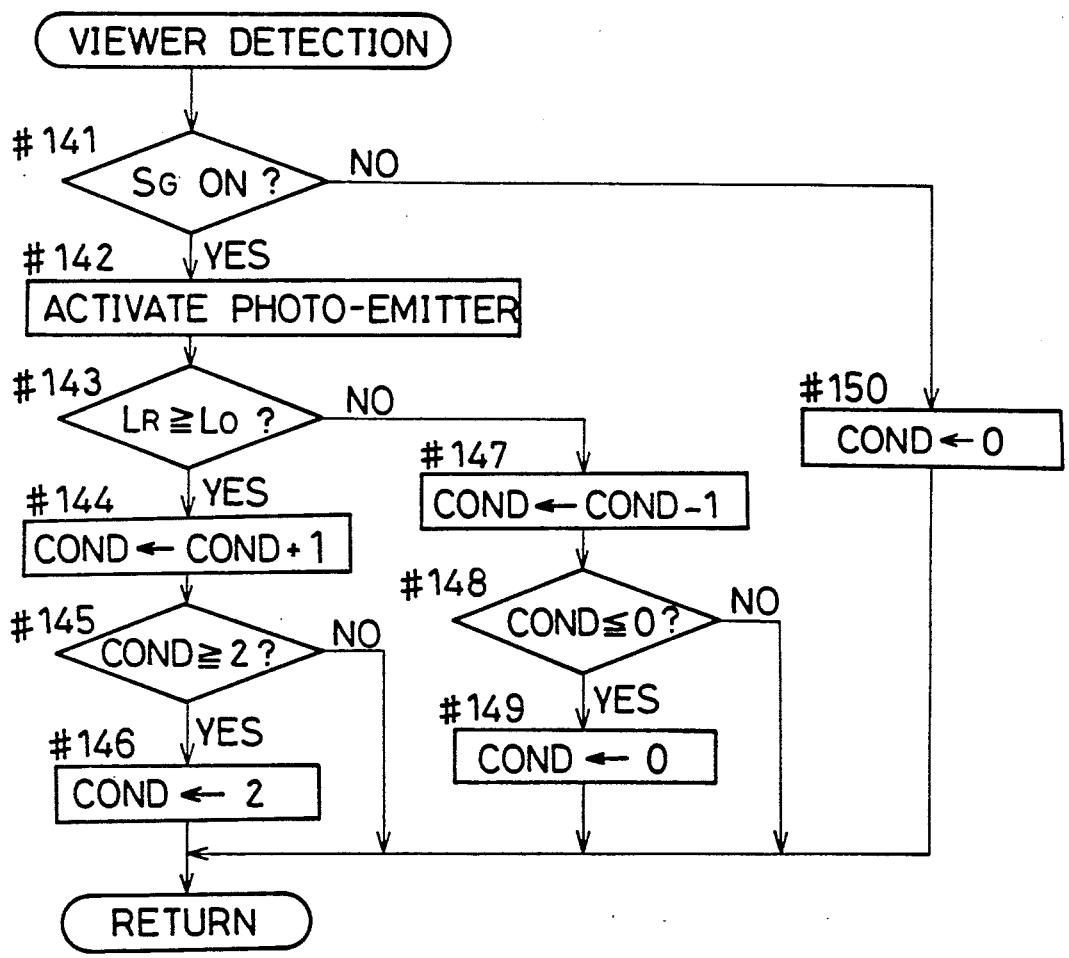

FIG. 5 is a flowchart of a viewer detecting routine executed as an interruption.

Figure 6:
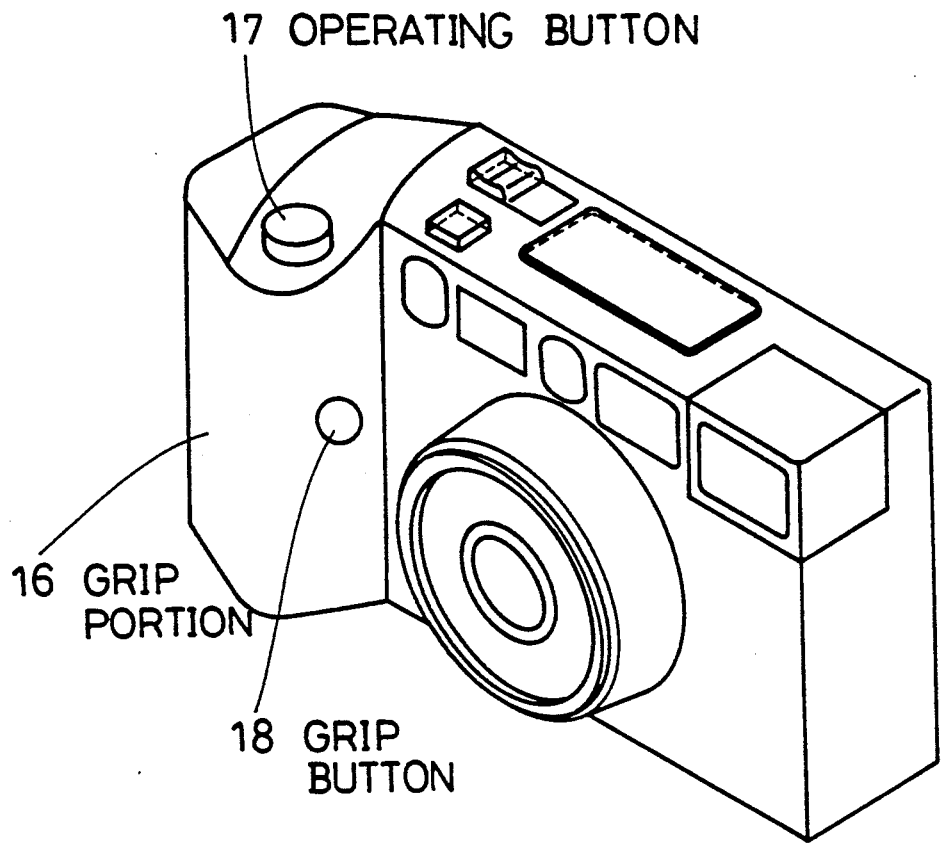

FIG. 6 is a front perspective view of the camera.

Figure 7:
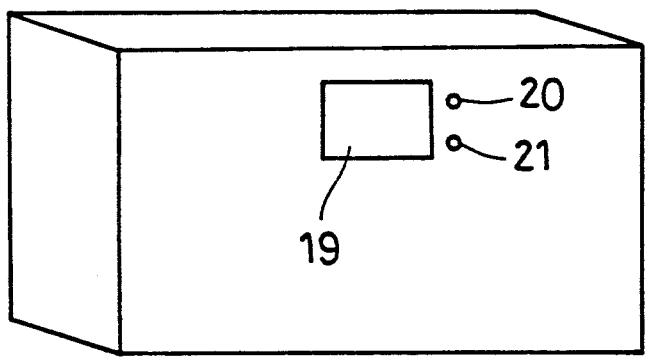

FIG. 7 is a rear perspective view of the camera.

DETAILED DESCRIPTION OF THE PREFERRED EMBODIMENTS

FIG. 6 and FIG. 7 show a camera to which the present invention is applied, and FIG. 1 is an illustration of an abstract functional structure of the embodiment.

The grip detector 1 of FIG. 1 detects that a photographer takes grip of the camera. Except very special occasions, a photographer holds the grip portion 16 (FIG. 6) of the camera when he takes a picture. Thus, in this embodiment, a grip switch button 18 is provided on the grip portion 16 so that a photographer can easily press the button 18 when he takes grip of the camera. When the button 18 is pressed, it is sensed by the grip detector 1 of FIG. 1.

The camera is also provided with a viewer detector 2 to detect a photographer viewing through the viewfinder 19. The sensing device of the viewer detector 2 is detailed in FIG. 7 in which a photo-emitter 20 and a photo-receptor 21 are included. The photo-emitter 20 is, for example, an LED (light emitting diode), and the photo-receptor 21 is an SPC (Silicon Photo-cell). When a photographer looks through the viewfinder 19, the light from the photo-emitter 20 is reflected by the face of the photographer and received by the photo-receptor 21. The photo-receptor 21 is adjusted so that it generates a reception signal only when it receives reflected light higher than a certain level.

The APZ-judging section 4 of FIG. 1 judges whether or not an APZ operation is appropriate based on the signals from the grip detector 1 and the viewer detector 2. When the APZ-judging section 4 determines that an APZ operation is appropriate, a signal is sent from the APZ-judging section 4 to a focal-length changer 5, which drives a zoom motor to adjust the focal length of a zoom lens of the camera to a calculated value according to the distance to the main object in order to obtain a preset magnification of the main object.

FIG. 2 shows a concrete structure of the control system of the present embodiment. A CPU (central processing unit) 10 is provided for the overall control of the camera of the present embodiment including the APZ control and a control of timers as described later. To the CPU 10 are connected: a photometer 11, an object distance detector 12, an exposure controller 13, the focal-length changer 5, a focal-length detector 14, the viewer detector 2, and several switches, i.e., a main switch $S_M$, lock switch $S_1$, exposure switch $S_2$ and a grip switch $S_G$.

The photometer 11 measures the luminance of the object and the object distance detector 12 detects the distance D to the object, whose detected values (luminance and distance D) are sent to the CPU 10. The exposure controller 13 controls the shutter release operation and the subsequent film winding operation based on control signals from the CPU 10. The focal-length detector 14 detects the focal length of a zoom lens of the camera while the focal length is being changed by the focal-length changer 5, and send the detected value to the CPU 10.

The main switch $S_M$ is for starting various operations of the camera. When the lock switch $S_1$ is turned on during an APZ operation, the zooming action is stopped and the distance, luminance and magnification are locked (determined) at this point for the subsequent exposure. The lock switch $S_1$ is turned on when an operating button 17 (FIG. 6) is pressed halfway. When the operating button 17 is fully pressed, the exposure switch $S_2$ turns on, whereby the shutter is released and a frame of the film is exposed. The grip switch $S_G$ turns on when the grip button 18 is pressed.

Figure 3:
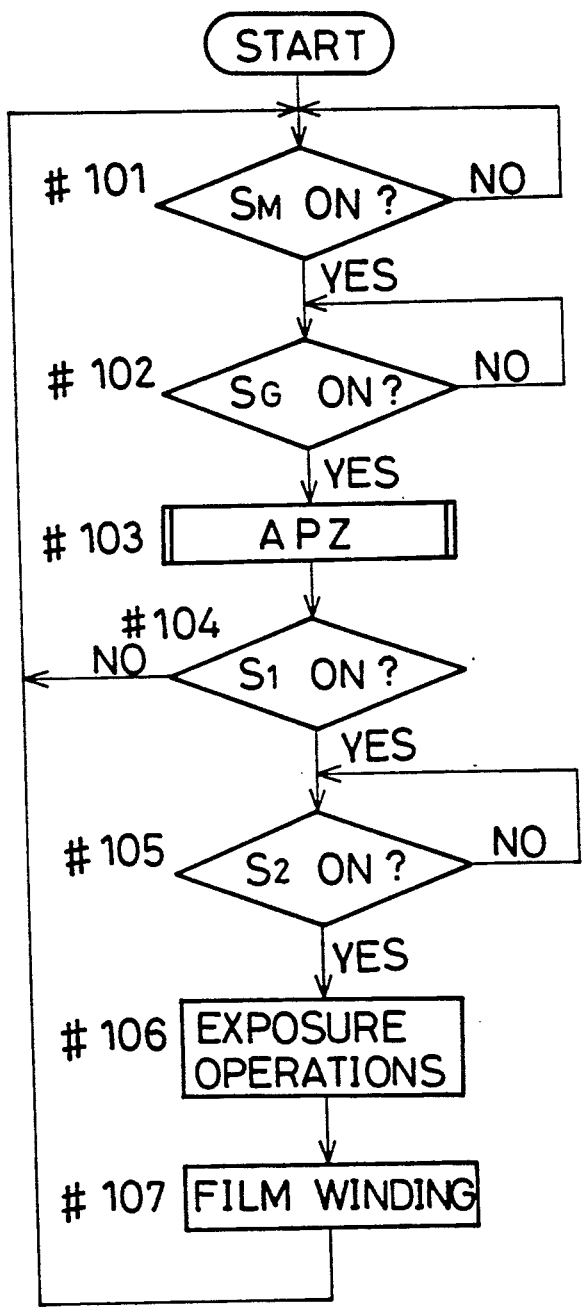
FIG. 3 is a flowchart of a main routine of the camera.

The operations of the CPU 10 are now explained with reference to the flowcharts of FIGS. 3, 4A, 4B and 5. When a battery is loaded in the camera, the CPU 10 executes the routine as shown by FIG. 3. It is determined at first step #101 whether the main switch $S_M$ is on. When the main switch $S_M$ is turned on, the process proceeds to step #102 where it is then determined whether the grip switch $S_G$ is on. When the grip switch $S_G$ is turned on, an APZ routine is executed at step #103 which will be detailed by FIGS. 4A and 4B. After the APZ routine, the lock switch $S_1$ is checked at step #104, where the steps #101-#104 are repeated until the lock switch $S_1$ is turned on. When the lock switch $S_1$ is turned on at step #104 and subsequently the exposure switch $S_2$ is turned on at step #105, a frame of the film is exposed at step #106 and the film is advanced to the next frame at step #107 by the exposure controller 13. After step #107, the process returns to step #101.

The APZ subroutine (step #103 of FIG. 3) is now explained with reference to FIGS. 4A and 4B. First in FIG. 4A, a register COND within the CPU 10 is reset to zero at step #111. As will be understood later, the register COND is used for surely detecting a viewer behind the viewfinder 19. Then a timer1 is started at step #112. The timer1 is used for timer interruptions of the CPU 10, i.e., the CPU 10 repeatedly executes an interruption routine (viewer detecting routine) until the switch $S_1$ is operated as shown in FIG. 5 at certain intervals according to the timer1. Now the explanation proceeds to the flowchart of the viewer detecting routine of FIG. 5.

First in this interruption routine, it is determined again at step #141 whether the grip switch $S_G$ is on. When the grip switch $S_G$ is off (which means that the photographer does not hold the camera body, and, in most cases, it can be assumed that the photographer has no intention of taking a photograph), the register COND is reset to zero at step #150, and the process returns. The step #141 determines the same event as the step #102 of FIG. 3 because there may be a case where the photographer releases the grip portion 16 (or releases the grip button 18) between the steps #102 and #141. When the grip switch $S_G$ is on at step #141 (i.e., it is assumed that the photographer is going to take a photograph), the photo-emitter 20 is activated at step #142. In order to save battery energy, the photo-emitter (LED) 20 emits light intermittently. While the photo-emitter 20 is activated, the photo-receptor 21 is also activated, and it is determined at step #143 whether the level of the receiving light of the photo-receptor 21 $L_R$ is higher than a preset reference level $L_O$. The reference level $L_O$ is predetermined so as to be able to surely detect the normal reflected light when a photographer is just (e.g., about 5 mm) behind the viewfinder 19 of the camera. When the level of the received light $L_R$ is higher than the reference level $L_O$, it is assumed that the photographer is looking into the viewfinder 19, and vice versa.

When the level of the received light at the photo-receptor 21 is higher than the reference level at step #143, the register COND is incremented by 1 at step #144, and then the incremented value is checked at step #145 whether it is larger than 2. If COND$\geq$2, it is restricted to 2 at step #146, and the process returns. If COND<2 at step #145, the process returns with the value of the register COND unchanged.

The process at steps #144-#146 are explained as follows. When the photographer wants to take a photograph, he takes hold of the grip portion 16 (and presses the grip button 18) of the camera body and looks into the viewfinder 19. At this time, the value of the register COND is 0 due to step #111 of FIG. 4A. When the level of the received light at the photo-receptor 21 becomes for the first time higher than the reference level in the viewer detecting routine (FIG. 5), the value of COND becomes 1, which cannot proceed the process from step #113 to #114 in the APZ routine of FIG. 4A (detailed later). When the level of the received light $L_R$ at the photo-receptor 21 becomes higher than the reference level $L_O$ at the next time execution of the viewer detecting routine (FIG. 5) after the preset interruption interval, the value of COND becomes 2, which enables the process going to step #114 et seq. This double checking is introduced for two reasons: one is to avoid an erroneous action by a noise, and the other is to prevent premature zooming action while the photographer has not yet completed the frame composition.

When the level $L_R$ of the received light is less than the reference level $L_O$ step #143, the register COND is decremented by 1 at step #147 and the decremented value is checked at step #148 whether it is equal to or less than 0. When COND≦0, the value is restricted to 0 at step #149 and the process returns. When COND>0, the process returns without changing the COND value.

Here the steps #143, #147, #148 and #149 are explained. When the photographer has no intention of photographing and is not looking into the viewfinder 19, COND remains 0 and no APZ operation is initiated. On the other hand, when he recedes from the viewfinder 19 while an APZ is being performed, it is once detected by the judgment step #143 (the level $L_R$ falls below the reference level $L_O$). But, in this embodiment, the APZ does not stop at this time because the value of COND is 1 (see the judgment of step #123 below). The APZ operation actually stops when the level $L_R$ is detected lower than the reference level $L_O$ consecutively twice and the value COND becomes 0. The double checking here is also for avoiding influence of noises, as in steps #143, #144, #145 and #146.

Returning to FIG. 4A, after the timer1 is started at step #112, the value of COND is checked at step #113 whether it is equal to 2. When COND=2 (i.e., the photographer is detected surely looking into the viewfinder 19), a timer2 is started at step #114, where t=0. The timer2 and the timer1 use a clock counter in the CPU 10. Then the photometer 11 and the object distance detector 12 are activated at step #115 to obtain an expected moving amount of a focusing lens, and a focusing operation is performed at step #116. Thereafter, the actual distance to the object $D_T$ is determined at step #117.

Then the timer 2 is checked at step #118 whether it exceeds a preset value (0.5 seconds in this embodiment), and the steps #115–#118 are repeated until t≧0.5. When t≧0.5, the timer2 is further checked at step #119 whether it is equal to or larger than another longer preset period (1 second in this embodiment). When t is less than 1 (i.e., 0.5≦t<1), it is judged at step #120 whether a change in the object distance $D_T$ is less than a preset value R. If the change $D_T$ is not less than the preset value R, it is assumed that the photographer is still trying his frame composition, and the steps #115–#120 are repeated. When the change in $D_T$ is less than the preset value R (i.e., it is assumed that the photographer has decided a frame composition), or after 1 second from step #114, an APZ operation is started at step #121 et seq.

Steps #114–#120 are explained as follows. From the time the photographer is detected looking into the viewfinder 19 at step #113, the APZ operation is prohibited for 0.5 seconds. During 0.5 to 1 second period, the APZ operation is enabled only when the object distance $D_T$ is stable. After 1 second, the APZ operation is started irrespective of the change in $D_T$. That is, the timer2 is used in steps #114–#120 for avoiding the initiation of an APZ operation while the photographer is still composing a frame and for preventing the influence of noises.

When the APZ operation is started, the focal length $F_T$ is first calculated at step #121 based on the object distance $D_T$ according to the formula (1) above. When the focal length $F_T$ is determined, a zooming action is started at step #122. After the zooming action is started, the current focal length $F_N$ is detected by the focal-length detector 14 at step #126 (FIG. 4B), and the detected focal length $F_N$ is compared with the focal length $F_T$ calculated at step #121. If they are not equal, the process returns to step #123 to continue the zooming action until the actual focal length $F_N$ comes to the calculated focal length $F_T$.

While the zooming action is underway, the register COND is checked at step #123 whether it is equal to 0. When COND=0, it is assumed that the photographer is not looking into the viewfinder 19 (it is noted here that the judgment is double checked by the viewer finding routine of FIG. 5), and thus the zooming action is stopped at step #132 and the process returns. When COND≠0 at step #123, the main switch $S_M$ is then checked at step #124 whether it is on. When the main switch $S_M$ is off, the zooming action is also stopped at step #132 and the process returns.

When the main switch $S_M$ is on at step #124, the lock switch $S_1$ is then checked at step #125 whether it is on. While the lock switch $S_1$ is not on (i.e., the operating button 17 is not pressed), the zooming action is continued. When the lock switch $S_1$ is turned while the zooming action is underway, the process proceeds from step #125 to step #128 where the zooming action is stopped. Then the photometer 11 and object distance detector 12 are activated at step #129 and a focusing operation is made at step #130. When $F_N$ and $F_T$ become equal (the actual focal length has come to the calculated value) at step #127, steps #128–#130 are also executed.

After step #130, the lock switch $S_1$ is checked at step #131. When the lock switch $S_1$ is not on, the process returns to step #114 of FIG. 4A to continue the APZ operation (continuous APZ mode). When the lock switch $S_1$ is on at step #131, the process returns to the main routine of FIG. 3 and steps #104–#107 are executed to perform the exposure operations. The lock switch $S_1$ checking step #104 of the main routine is provided besides the same checking step #131 of the APZ subroutine for the sake of the process course returning through steps #123→#132→main routine or #124→#132→main routine.

As described above, there is no need of subtle or difficult operation (e.g., slightly pressing the operating button 17 to the halfway) to start the APZ operation. The APZ operation automatically starts in the present embodiment when the photographer takes hold of the grip portion 16 of the camera (step #102) and he looks into the viewfinder 19. The photographer's viewfinding action is assured by the double checking (COND=2) of the viewer detecting routine (FIG. 5). The photographer's not-viewfinding action is also double checked before stopping the APZ operation. Further, after the photographer looks into the viewfinder 19 and before the APZ operation is actually started, a time interval is introduced to avoid an erroneous operation due to noises. The time interval also allows the photographer to compose a picture frame.

In the above-described embodiment, the explanation was made supposing that the viewer detection is for a photographer looking into the viewfinder. But, as easily understood by the structure of the viewer detector 2, the viewer detector 2 of the embodiment can detect a photographer holding the camera at a lower level in front of his body, e.g., on his chest or on his waist, without looking into the viewfinder. When the photographer holds the camera body at that position, the APZ operation can start in the embodiment. This is allowable regarding the case when the photographer wants to take a photograph without being noticed by the object he is going to take.

The photo-emitter 20 and photo-receptor 21 need not be near the viewfinder 19 but may be on another place of the camera body if the photographer's body comes close to them when he is in the position of taking a photograph. For such a type of camera which has a look-down viewfinder and is normally used at the waist level, the photo-emitter 20 and photo-receptor 21 can be placed at the back of the camera body.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as being included therein.

What is claimed is:

1. A camera having a shutter release operating member, comprising:
   a portion for holding the camera in taking a photograph;
   a first detector for detecting that a photographer holds the holding portion and for generating a first detection signal;
   a second detector for detecting the photographer who looks into a viewfinder of the camera irrespective of an operation of said shutter release operating member and for generating a second detection signal; and
   a controller for starting a predetermined operation of the camera responsive to both the first detection signal and the second detection signal.

2. A camera as in claim 1, where the second detector detects that the photographer is looking into a viewfinder of the camera, and generates the second detection signal when the photographer is looking into the viewfinder.

3. A camera as in claim 1, where the predetermined operation of the camera is an automatic program zooming in which the focal length of a zoom lens attached to the camera is changed depending on the distance to an object to obtain a preset magnification of the object.

4. A camera as in claim 1, where the predetermined operation of the camera is a focusing operation.

5. A camera as in claim 1, where the predetermined operation of the camera is a photometering operation.

6. A camera as in claim 1, where the second detector comprises a photo-emitter for emitting light and a photoreceptor for receiving light emitted by the photo-emitter and reflected by the photographer.

7. A camera having a shutter release operating member, comprising:
   a detector for detecting a photographer who looks into a viewfinder of the camera irrespective of an operation of said shutter release operating member and for generating a detection signal;
   a counter for counting the number of the detection signal generated by the detector and for generating a decision signal when the number reaches a preset value; and
   a controller for starting a predetermined operation of the camera responsive to the decision signal.

8. A camera as in claim 7, where the detector detects that the photographer is looking into a viewfinder of the camera, and generates the detection signal when the photographer is looking into the viewfinder.

9. A camera as in claim 7 further comprising
   a portion for holding the camera in taking a photograph and
   a second detector for detecting that a photographer holds the holding portion and for generating a second detection signal,
   where the controller starts the predetermined operation of the camera responsive to both the decision signal and the second detection signal.

10. A camera as in claim 7, where the predetermined operation of the camera is an automatic program zooming in which the focal length of a zoom lens attached to the camera is changed depending on the distance to an object to obtain a preset magnification of the object.

11. A camera as in claim 7, where the predetermined operation of the camera is a focusing operation.

12. A camera as in claim 7, where the predetermined operation of the camera is a photometering operation.

13. A camera as in claim 7, where the detector comprises a photo-emitter for emitting light and a photoreceptor for receiving light emitted by the photo-emitter and reflected by the photographer.

14. A camera having a shutter release operating member, comprising:
   a detector for detecting a photographer who looks into a viewfinder of the camera irrespective of an operation of said shutter release operating member and for generating a detection signal;
   a timer for counting a time since the detection signal is generated by the detector and for generating a decision signal when the time reaches a preset value; and
   a controller for starting a predetermined operation of the camera responsive to the decision signal.

15. A camera as in claim 14, where the detector detects that the photographer is looking into a viewfinder of the camera, and generates the detection signal when the photographer is looking into the viewfinder.

16. A camera as in claim 14, where the predetermined operation of the camera is an automatic program zooming in which the focal length of a zoom lens attached to the camera is changed depending on the distance to an object to obtain a preset magnification of the object.

17. A camera as in claim 14, where the predetermined operation of the camera is a focusing operation.

18. A camera as in claim 14, where the predetermined operation of the camera is a photometering operation.

19. A camera as in claim 14 further comprising
   a portion for holding the camera in taking a photograph and
   a second detector for detecting that a photographer holds the holding portion and for generating a second detection signal,
   where the controller starts the predetermined operation of the camera responsive to the decision signal after receiving the second detection signal.

20. A camera as in claim 14, where the detector comprises a photo-emitter for emitting light and a photoreceptor for receiving light emitted by the photo-emitter and reflected by the photographer.

21. A camera comprising:
   a detector for detecting whether a photographer who looks into a viewfinder of the camera exists or not and for generating a detection signal when the photographer who looks into the viewfinder does not exist;

a counter for counting the number of the detection signal generated by the detector and for generating a decision signal when the number reaches a preset value; and a controller for ending a predetermined operation of the camera responsive to the decision signal.

22. A camera as in claim 21, where the detector detects whether or not the photographer is looking into a viewfinder of the camera, and generates the detection signal when the photographer is not looking into the viewfinder.

23. A camera as in claim 21, where the predetermined operation of the camera is an automatic program zooming in which the focal length of a zoom lens attached to the camera is changed depending on the distance to an object to obtain a preset magnification of the object.

24. A camera as in claim 21, where the predetermined operation of the camera is a focusing operation.

25. A camera as in claim 21, where the predetermined operation of the camera is a photometering operation.

26. A camera as in claim 21, where the detector comprises a photo-emitter for emitting light and a photo-receptor for receiving light emitted by the photo-emitter and reflected by the photographer.

27. A camera comprising:
a detector for detecting whether a photographer who looks into a viewfinder of the camera exists or not and for generating a detection signal when the photographer who looks into the viewfinder does not exist;

a timer for counting a time since the detection signal is generated by the detector and for generating a decision signal when the time reaches a preset value; and a controller for ending a predetermined operation of the camera responsive to the decision signal.

28. A camera as in claim 27, where the detector detects whether or not the photographer is looking into a viewfinder of the camera, and generates the detection signal when the photographer is not looking into the viewfinder.

29. A camera as in claim 27, where the predetermined operation of the camera is an automatic program zooming in which the focal length of a zoom lens attached to the camera is changed depending on the distance to an object to obtain a preset magnification of the object.

30. A camera as in claim 27, where the predetermined operation of the camera is a focusing operation.

31. A camera as in claim 27, where the predetermined operation of the camera is a photometering operation.

32. A camera as in claim 27, where the detector comprises a photo-emitter for emitting light and a photo-receptor for receiving light emitted by the photo-emitter and reflected by the photographer.

33. A camera having a shutter release operating member comprising:
a portion for holding the camera in taking a photograph;
a first detector for detecting that a photographer holds the holding portion and for generating a first detection signal;
a second detector for detecting that the photographer is in the vicinity of the camera prior to operation of said shutter release operating member and for generating a second detection signal; and a controller for starting a predetermined operation of the camera responsive to both the first detection signal and the second detection signal.

34. A camera is in claim 33, where the second detector detects that the photographer is looking into a viewfinder of the camera, and generates the second detection signal when the photographer is looking into the viewfinder.

35. A camera as in claim 33, where the predetermined operation of the camera is an automatic program zooming in which the focal length of a zoom lens attached to the camera is changed depending on the distance to an object to obtain a preset magnification of the object.

36. A camera as in claim 33, where the predetermined operation of the camera is a focusing operation.

37. A camera as in claim 33, where the predetermined operation of the camera is a photometering operation.

38. A camera as in claim 33, where the second detector comprises a photo-emitter for emitting light and a photo-receptor for receiving light emitted by the photo-emitter and reflected by the photographer.

39. A camera comprising:
distance measuring means for measuring an object distance;
focal length changing means for changing a focal length according to an object distance obtained by said distance measuring means so that a magnification of an object is a predetermined value;
a release button which is operated to start an exposure operation;
designating means for designating an operation of said focal length changing means prior to operation of said release button; and
inhibiting means for inhibiting the operation of said focal length changing means when said release button is operated.

40. A camera as in claim 39, where said designating means includes sensor means for sensing that a photographer is in the vicinity of the camera and designates said operation of the focal length changing means when it is sensed that the photographer is in the vicinity of the camera.

41. A camera as in claim 40, where said sensor means senses that the photographer is looking in a viewfinder of the camera.

42. A camera comprising:
distance measuring means for repeatedly measuring an object distance;
focal length changing means for changing a focal length according to an object distance obtained by said distance measuring means so that a magnification of an object is a predetermined value;
designating means for designating an operation of said focal length changing means; and
detecting means for inputting object distance data outputted by said distance measuring means and detecting that a difference between the object distance and a previous object distance is within a predetermined value,
where the operation of said focal length changing means is designated by said designating means and said focal length changing means operates when it is detected by said detecting means that said difference is within the predetermined value.

43. A camera as in claim 42, where said designating means includes sensor means for sensing that a photographer is in the vicinity of the camera and designates said operation of the focal length changing means when it is sensed that the photographer is in the vicinity of the camera.

44. A camera as in claim 43, where said sensor means senses that the photographer is looking into a viewfinder of the camera.

45. A camera as in claim 42, further comprising a timer which is started by the designating means and that inhibits the operation of said focal length changing means until a predetermined time has passed.

46. A camera as in claim 42, further comprising a timer which is started by the designating means and that starts magnification changing means regardless of a detection result by the detecting means.

47. A camera as in claim 43, further comprising a second timer which is started by the designating means and that starts magnification changing means regardless of a detection result by the detecting means.

* * * * *